July 7, 1964

A. L. CAMP 3,139,901

PRESSURE REGULATOR VALVE

Filed April 2, 1962

INVENTOR.
ALFRED L. CAMP
BY
Lyon & Lyon
ATTORNEYS

United States Patent Office 3,139,901
Patented July 7, 1964

3,139,901
PRESSURE REGULATOR VALVE
Alfred L. Camp, Brea, Calif., assignor to Irving Terry, doing business as The Wilkins Regulator Company, Los Angeles, Calif.
Filed Apr. 2, 1962, Ser. No. 184,462
2 Claims. (Cl. 137—505.18)

This invention relates to pressure regulator valves, and included in the objects of the present invention are:

First, to provide a pressure regulator valve which is particularly suited for use to regulate the water pressure in domestic and industrial plumbing installations, to isolate such installations from excessive pressure in the supply line, and which in order to meet such use is relatively simple and economical of manufacture.

Second, to provide a pressure regulator valve wherein those parts which are subject to wear may be readily removed and replaced without removing the regulator from the line.

Third, to provide a pressure regulator valve which is fully balanced with respect to pressure at the upstream side of the regulator, whereby fluctuations or various pressure conditions at the upstream side of the regulator have no effect on its operation.

Fourth, to provide a pressure regulator valve which is so arranged that, should the downstream pressure exceed the upstream pressure, a condition which may be caused by thermal expansion of the water downstream of the pressure regulator valve, water may leak upstream through the valve to relieve such excess pressure without interfering with or impairing normal operation of the pressure regulator valve.

With the above and other objects in view, as may appear hereinafter, reference is directed to the accompanying drawings in which.

Figure 1:
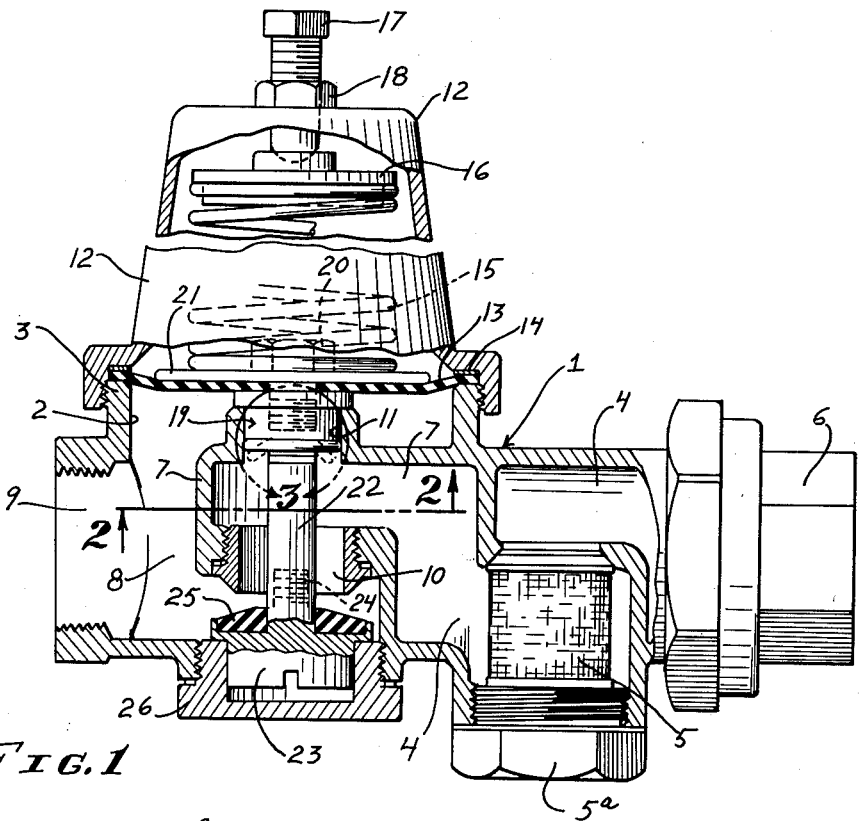
FIGURE 1 is a partial side view, partial sectional view of the pressure regulator valve.
Figure 2:
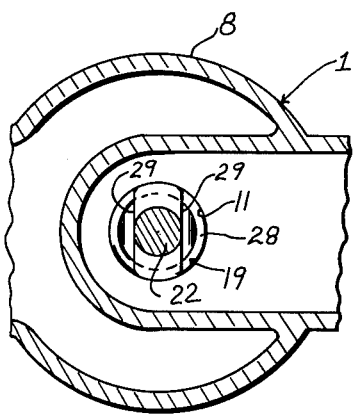
FIGURE 2 is a fragmentary, sectional view thereof taken through 2—2 of FIGURE 1, showing particularly the means for relieving excess downstream pressure.

The pressure regulator valve comprises a valve body 1 which includes a vertically extending, substantially cylindrical valve chamber 2 having an externally screw-threaded upper end 3. Separated from the valve chamber 2 by a side wall thereof is an essentially S-shaped inlet passage 4 in which is interposed a removable filler screen 5 covered by a cap 5a screw-threaded into one side of the valve body. The upstream extremity of the inlet passage 4 is provided with a coupling fitting 6.

Projecting radially into the valve chamber 2 and forming a continuation of the inlet passage 4 is a hollow boss 7. The hollow boss 7 forms with the valve chamber 2 a vertical C-shaped passageway 8 which communicates between the upper and lower extremities of the valve chamber 2. The valve chamber is intersected by an outlet port 9 which may be disposed in coaxial relationship with the inlet coupling fitting 6.

The underside of the hollow boss 7 is provided with a vertical bore which intersects the passage 4 and is provided with an annular valve seat fitting 10. The upper wall of the hollow boss 7 is provided with a bore 11 equal to the effective area of the opening through the valve seat fitting 10.

The externally screw-threaded upper end 3 of the valve chamber 2 receives the lower end of a spring housing 12. The spring housing cooperates with the upper end of the valve chamber 2 to clamp a diaphragm 13 and a gasket 14. Within the spring housing 12 there is mounted a pressure regulator spring 15, the upper end of which receives a disk 16 engaged by a pressure regulator screw 17 which extends outwardly through the upper end of the spring housing 12. Adjustment of the screw 17 regulates the force exerted by the spring 15. A lock nut 18 serves to secure the regulator screw 17 in any of its adjusted positions.

Disposed under the diaphragm 13 is a piston 19 which is slidably received in the bore 11. A bolt 20 extends downwardly through the diaphragm 13, as well as a diaphragm washer 21, and is screw-threaded into the upper end of the piston 19. A stem 22 projects downward from the piston 19 through the valve seat fitting 10. A valve washer cup 23 having a screw-threaded stem 24 screw-threads into the valve stem 22. A valve washer 25 is seated in the cup 23 and engages the valve seat fitting 10.

The lower end of the valve chamber 2 is closed by a cap 26. The valve washer cup 23 fits within the cap 26 so as to provide a restricted pathway, in order to dampen any sudden movement of the valve assembly and thus minimize transient peak pressures or water hammer.

The piston 19 is provided with an annular groove 27 which receives an O-ring 28. The upstream side of the groove 27 is cut away on diametrically opposite sides as indicated by 29. This arrangement is of primary importance when the regulator valve is used in a system wherein water downstream of the regulator might expand thermally to a pressure above the upstream side of the valve.

The pressure regulator valve operates as follows:

Line pressure is exerted in opposite directions on the piston 19 and valve washer 25. Inasmuch as these areas are substantially equal, the upstream or line pressure exerts no force to move the valve stem 22. Thus the only biasing force exerted on the valve stem is the force exerted by the spring 15 which urges the valve towards its open position. Back pressure in the valve chamber 2 acting against the relatively large area of the diaphragm 13 urges the valve toward its closed position in opposition to the spring 15. Drop in pressure in the plumbing installation connected with the outlet end of the regulator permits the valve to open. By adjustment of the spring 15, the pressure differential between the inlet and outlet sides of the regulator at which the valve opens or closes may be predetermined.

As pointed out previously, the regulator valve is primarily adapted for use in conjunction with a plumbing system in which the water downstream of the regulator valve may expand thermally. More particularly, the plumbing system may involve a water heater with associated pipe lines and outlet valves. When these valves are closed, the plumbing system is completely sealed. As a consequence, thermal expansion of the water can build up pressures substantially above the pressure at the upstream side of the regulator valve.

It has been conventional practice to provide a pressure relief valve. Such a valve may stand idle for a long period of time, and may fail to relieve the pressure when the emergency arises, or may fail to close after relieving the pressure. A relief valve is relatively expensive, and means must be provided to drain away the water which passes the relief valve.

By permitting water to pass upstream between the piston 19 and the bore 11, the downstream pressure, due to thermal expansion of the water, cannot rise appreciably above the pressure upstream of the regulator. By reason of the fact that the regulator is in operation whenever water is withdrawn downstream, the regulator, and hence the piston 19 and O-ring 28, does not remain idle.

Thus, by providing notched portions 29 so that the

Figure 3:
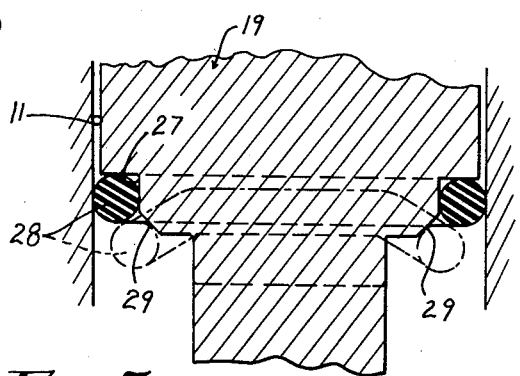
FIGURE 3 is a further enlarged, fragmentary, sectional view taken within circle 3 of FIGURE 1, showing in detail the manner in which excess downstream pressure is relieved.

O-ring 28 may deflect, as shown in FIGURE 3, and permit moderate upstream flow of water, all the advantages of a pressure relief valve without its disadvantages are attained. Furthermore, these advantages are accomplished without any additional expense.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. A regulator valve, comprising:
   (a) a valve body defining a passage, normally forming an inlet, opposed bores communicating with said passage, a valve chamber communicating with the opposed ends of said bores, and a port, normally forming an outlet, communicating with said chamber;
   (b) a valve element for one of said bores to permit flow from said passage to said port;
   (c) a pressure-balancing piston slidable in the other of said bores;
   (d) a stem connecting said piston and valve element for simultaneous movement thereof;
   (e) said piston defining an O-ring groove contiguous to said stem, and notched portions at the passage side of said O-ring groove interrupting said groove at diametrically opposite sides thereof and toward said passage, said notched portions having faces converging toward said stem;
   (f) a flexible O-ring fitting said groove for sealing engagement with the walls of the surrounding bore and adapted, in response to a condition of greater pressure in said passage than in said chamber, to seal said piston in said bore;
   (g) said O-ring including arcuate portions bridging said notched portions, said notched portions being of sufficient arcuate extent and said O-ring being sufficiently flexible that said O-ring is deflectable over said converging surfaces clear of the walls of the surrounding bore, thereby to permit back flow toward said passage;
   (h) and a spring-backed diaphragm exposed to said chamber and connected with said piston and valve element, said diaphragm being responsive to pressure in said chamber to close said valve element on rise of pressure in said valve chamber to a predetermined value.

2. In a pressure balanced regulator valve having a downstream side and an upstream side, a back pressure bleeding means, comprising:
   (a) a pressure-balancing piston disposed in a bore between the downstream and upstream sides of said regulator;
   (b) a stem connecting said piston and valve element for simultaneous movement thereof;
   (c) said piston defining an O-ring groove contiguous to said stem, and notched portions at the upstream side of said O-ring groove interrupting said groove at diametrically opposite sides thereof, said notched portions having faces converging upstream toward said stem;
   (d) and a flexible O-ring fitting said groove for sealing engagement with the walls of the surrounding bore and adapted, in response to a condition of greater pressure in said passage than in said chamber, to seal said piston in said bore;
   (e) said O-ring including arcuate portions bridging said notched portions, said notched portions being of sufficient arcuate extent and said O-ring being sufficiently flexible that said O-ring is deflectable over said converging surfaces clear of the walls of the surrounding bore, thereby to permit back flow toward said passage.

References Cited in the file of this patent

UNITED STATES PATENTS

| | | |
|---|---|---|
| 941,153 | Krichbaum | Nov. 23, 1909 |
| 1,050,036 | Mueller | Jan. 7, 1913 |
| 2,614,793 | Storm | Oct. 21, 1952 |
| 2,730,269 | Earle | Jan. 10, 1956 |
| 2,905,462 | Christensen | Sept. 22, 1959 |